(12) United States Patent
Gillig et al.

(10) Patent No.: US 7,742,764 B2
(45) Date of Patent: Jun. 22, 2010

(54) METHOD AND APPARATUS FOR DETERMINING APPROPRIATE CHANNELS FOR COMMUNICATION

(75) Inventors: Steven F. Gillig, Roselle, IL (US); Stephen L. Kuffner, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 760 days.

(21) Appl. No.: 11/690,323

(22) Filed: Mar. 23, 2007

(65) Prior Publication Data
US 2008/0233991 A1 Sep. 25, 2008

(51) Int. Cl.
*H04W 4/00* (2009.01)
*H04W 72/00* (2009.01)

(52) U.S. Cl. .................. 455/434; 455/464; 455/450

(58) Field of Classification Search .......... 455/434, 455/450, 464, 516, 452.1, 67.11, 512, 527; 370/329, 330, 443, 444, 395.42
See application file for complete search history.

(56) References Cited

U.S. PATENT DOCUMENTS

| | | | | | |
|---|---|---|---|---|---|
| 6,771,957 | B2 * | 8/2004 | Chitrapu | ............ | 455/423 |
| 7,313,393 | B2 * | 12/2007 | Chitrapu | ............ | 455/425 |
| 7,424,268 | B2 * | 9/2008 | Diener et al. | ............ | 455/62 |
| 7,483,700 | B2 * | 1/2009 | Buchwald et al. | ............ | 455/434 |
| 7,564,816 | B2 * | 7/2009 | McHenry et al. | ............ | 370/329 |
| 7,610,036 | B2 * | 10/2009 | Teo et al. | ............ | 455/403 |
| 2008/0261537 | A1 * | 10/2008 | Chen | ............ | 455/68 |
| 2009/0161610 | A1 * | 6/2009 | Kang et al. | ............ | 370/329 |
| 2009/0207735 | A1 * | 8/2009 | Letaief et al. | ............ | 370/237 |
| 2009/0247201 | A1 * | 10/2009 | Ye et al. | ............ | 455/509 |
| 2009/0252178 | A1 * | 10/2009 | Huttunen et al. | ............ | 370/445 |
| 2010/0008312 | A1 * | 1/2010 | Viswanath | ............ | 370/329 |

FOREIGN PATENT DOCUMENTS

WO WO2005121959 A2 12/2005

OTHER PUBLICATIONS

D. Cabric et al, "A Cognitive Radio Approach for Usage of Virtual Unlicensed Spectrum", Jul. 2004.

* cited by examiner

*Primary Examiner*—Sonny Trinh
(74) *Attorney, Agent, or Firm*—Kenneth Haas

(57) ABSTRACT

During operation of a secondary communication system 100, a device will perform spectrum sensing of certain channels (either by itself or as part of a group of nodes 104). When activity is found on a channel from a primary user, other devices will be notified that the channel is not available for use. The device may then modify its spectrum sensing to assist another device (or group of devices) that have not yet found activity on a different set of channels. By assigning additional channels to devices with extra capacity, the overall spectrum-sensing efficiency and performance of the communication system 100 is raised.

20 Claims, 2 Drawing Sheets

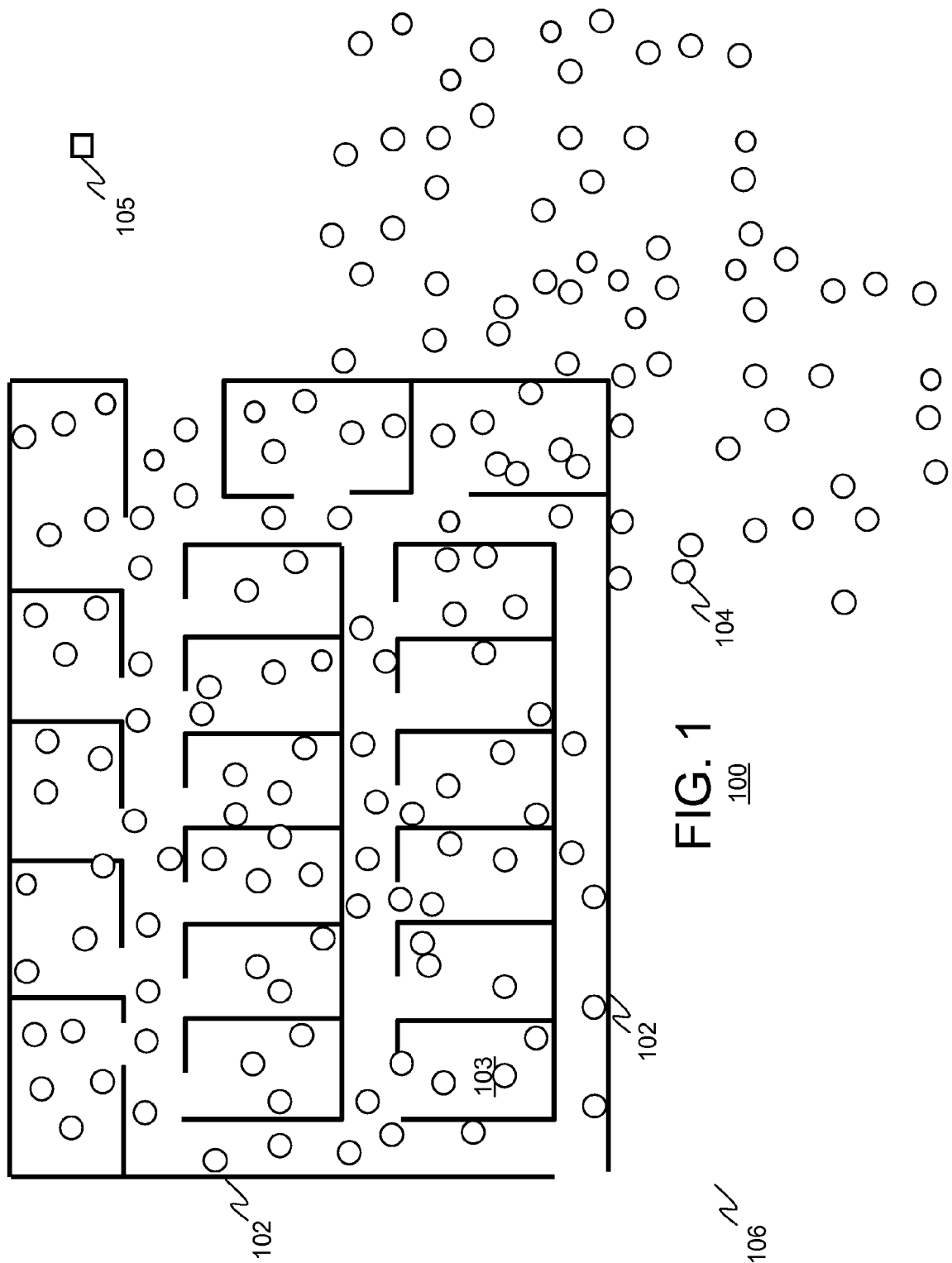

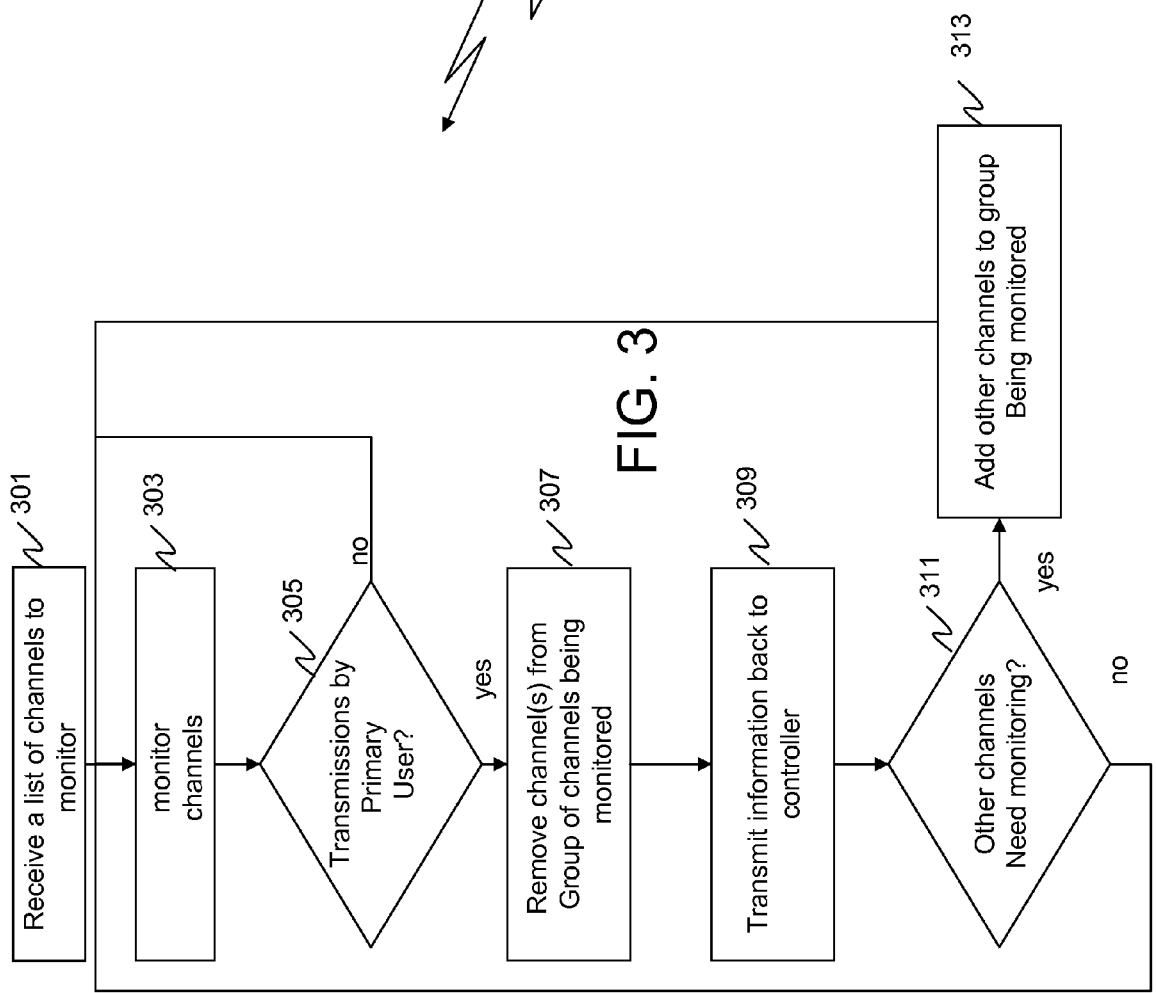

METHOD AND APPARATUS FOR DETERMINING APPROPRIATE CHANNELS FOR COMMUNICATION

FIELD OF THE INVENTION

The present invention relates generally to determining appropriate channels for communication and in particular, to a method and apparatus for determining appropriate channels for communication within a cognitive radio system.

BACKGROUND OF THE INVENTION

In a cognitive radio system of the type considered for use by IEEE 802-sponsored systems as well as other cognitively-enabled systems under consideration, a cognitive secondary radio system will utilize spectrum assigned to a primary system using an opportunistic approach. With this approach, the secondary radio system will share the spectrum with primary incumbents as well as those operating under authorization on a secondary basis. Under these conditions, it is imperative that any user in the cognitive radio system not interfere with primary users.

A proposed technique for identifying available channels for use by the secondary communication system involves measuring the signal strength of various channels by nodes within the secondary radio system. This information is reported back to a network controller. If the signal strength of any channel is above a predetermined signal level, the network controller prevents secondary devices from transmitting on that channel.

A weakness in the above technique is that it becomes prohibitive for nodes to monitor all possible channels. Thus, while cognitive radio holds the promise of adding additional spectrum for use by users, a need exists for a method and apparatus for determining appropriate channels for communication within a cognitive radio system that reduces the complexity of nodes required to make such a determination.

BRIEF DESCRIPTION OF THE DRAWINGS

FIG. 1 is a block diagram of a communication system.

FIG. 2 is a block diagram of a node of FIG. 1.

FIG. 3 is a flow chart showing operation of the node of FIG. 2.

DETAILED DESCRIPTION OF THE DRAWINGS

In order to address the above-mentioned need, a method and apparatus for determining appropriate channels for communication is provided herein. During operation of a secondary communication system, a node will perform spectrum sensing of certain channels (either by itself or as part of a group of devices). When activity is found on a channel from a primary user, other nodes will be notified that the channel is not available for use. The node may then modify its spectrum sensing to assist another device (or group of devices) that have not yet found activity on a different set of channels. By assigning additional channels to devices with extra capacity, the overall spectrum-sensing efficiency and performance of the communication system is raised.

In one scenario, a node will monitor a number (N) of channels for activity (i.e., transmissions by a primary user). When the node determines that one or more of the channels are occupied, it will no longer need to monitor that channel for some period of time. Because the node now will monitor <N channels, the node may assist other nodes in monitoring other channels, so that it will continue to monitor N channels.

In another scenario, a group of nodes will monitor a group of channels, with differing groups of nodes monitoring differing channels. When the group determines that one or more of the channels are occupied it will temporarily suspend monitoring the one or more channels. Because the group will have more than adequate resources to monitor the remaining channels, it may assign one of the nodes in the group to help out another group in monitoring other channels.

Several different criteria can be used either together or separately to determine which of the devices are best suited for assisting the other devices for monitoring channels. For example, selecting devices to assist other devices may be based on identifying desirable cooperative attributes such as a) their statistical independence in the spectrum sensing environment, b) their complementary spectrum sensing capability such as their ability to detect complementary types of modulation schemes, c) their ability to form a peer to peer communication link, or d) their location relative to the other devices to be assisted.

Because nodes that have extra capacity to monitor channels will be utilized in spectrum sensing, the above technique provides a way to improve spectrum sensing capabilities, allowing many more channels to be monitored than with prior-art techniques. Additionally, the above technique provides a way to deploy more spectrum sensing resources on channels where additional resources can result in more reliable spectrum sensing decisions.

The present invention encompasses a method comprising the steps of monitoring a group of channels for transmissions as part of a secondary communication system, determining that a channel from the group of the channels has transmissions by a primary user, and removing the channel from the group of channels being monitored. A determination is made that other channels from outside of the group of channels need monitoring and these channels are added to the group of channels being monitored for transmissions.

The present invention additionally encompasses a method comprising the steps of monitoring a group of N channels for activity as part of a secondary communication system, determining that a channel from the group of N channels has activity by a primary user, and removing the channel from the group of N channels being monitored. A determination is then made that other channels from outside of the group of N channels need monitoring and these channels are added to the group of channels being monitored for activity so that a total number of channels being monitored is equal to N channels.

The present invention additionally encompasses an apparatus comprising monitoring circuitry monitoring a group of channels for transmissions as part of a secondary communication system, and logic circuitry determining that a channel from the group of the channels has transmissions by a primary user, removing the channel from the group of channels being monitored, determining that other channels from outside of the group of channels need monitoring, and adding channels outside the group of channels to the group of channels being monitored for transmissions.

Turning now to the drawings, wherein like numerals designate like components, FIG. 1 is a block diagram of communication system 100 deployed inside and outside an interior of an office building. The office building comprises perimeter wall 102 that encloses a plurality of rooms 103 (only one labeled). Communication system 100 is preferably a cognitive radio system that comprises a number of wireless devices, or nodes 104-105 involved in determining a particular channel/frequency for transmission and reception.

Circular objects, or nodes 104 (only one labeled) represent wireless devices that operate as part of a secondary communication system, and utilize spectrum assigned to a primary communication system using an opportunistic approach. With this approach, secondary nodes 104 will share the spectrum with primary nodes (not shown) as well as those operating under authorization on a secondary basis. It should be noted that wireless devices 104 are considered part of communication system 100 in that they share information on available channels. It is not necessary that wireless devices 104 are capable of wireless communication between each other. In fact, wireless devices 104 may be utilizing different communication system protocols for communications. However, wireless devices 104 do all need to be able to communicate with controller node 105.

Rectangular objects represent a wireless device that operates as a controller/coordinator 105 to assign channels within cognitive radio system 100. As part of channel assignment, controller 105 will have a list of all channels that need to be monitored along with information as to whether or not a channel is "occupied" by the primary user. More particularly, controller 105 will have an internal database that keeps track of all channels that need monitoring by the secondary communication system. The database will also keep track of whether or not activity was detected on a particular channel along with a confidence level of whether or not activity has been detected. For example, controller 105 may identify a channel as being occupied by the primary communication system when a single node detects activity on the channel. Contrarily, a channel may be identified as having no activity when multiple (e.g., three) nodes have identified the channel as having no detectable primary communication system transmissions. Controller 105 will share information with all nodes 104 within communication system 100.

It should be noted that although FIG. 1 shows nodes 104 existing within a two-dimensional space, one of ordinary skill in the art will recognize that nodes 104 may be located in other environments, including 3-dimensional spaces. For example, nodes 104 may comprise public safety first responder radio equipment located within a multi-level building, golf carts equipped with wireless transceivers located on a golf course, inventory tags located within a multi-level warehouse, . . . , etc.

Irrespective of the environment where nodes 104 operate, it is imperative that any node in the cognitive radio system not interfere with primary users. In order to avoid interfering with users of the primary communication system, nodes 104 will measure the signal strength and/or other parameters of a plurality of potential channels/frequencies. Channel information is passed back to controller 105.

Monitoring for transmissions is a general approach to determining whether transmissions exist within a frequency band or within a frequency channel or group of channels. It may consist of directly scanning channels for transmissions utilizing one or more modulation sensing schemes, or it may be an indirect method of determining whether transmissions exist, such as consulting a database, listening for a beacon indicating whether transmissions exist, or it may be a combination of these or other approaches to determining whether transmissions exist.

As discussed above, a weakness of prior-art systems is that prior-art nodes must be able to monitor all possible channels for communication. In order to address this issue, nodes 104 will only monitor a subset of all channels. When activity is found on a channel from a primary user, other nodes will be notified that the channel is not available for use. The node may then modify its spectrum sensing to assist another device (or group of devices) that have not yet found activity on a different set of channels. Nodes 104 will share channel information (i.e., if a particular channel is occupied) with other nodes 104. This may be done via passing/communicating the information to controller 105 causing controller 105 to share the channel information with other nodes 104.

By assigning additional channels to devices with extra capacity, the overall spectrum-sensing efficiency and performance of the communication system is raised.

It should be noted that in the preferred embodiment of the present invention controller 105 will keep track of how many channels each node 104 is monitoring. Controller 105 may attempt to keep nodes monitoring a number (N) of channels for activity. When the node determines that one or more of the channels are occupied, it will no longer need to monitor that channel for some period of time. Because the node now will monitor <N channels, controller 105 will assign the node additional channels so that the node may assist other nodes in monitoring for activity.

Controller 105 may utilize several different alternatives to determine which of the devices are best suited for assisting the other devices. For example, selecting devices to assist other devices may be based on identifying desirable cooperative attributes such as a) their statistical independence in the spectrum sensing environment, b) their complementary spectrum sensing capability such as their ability to detect complementary types of modulation schemes, c) their ability to form a peer to peer communication link, or d) their location relative to the other devices to be assisted.

Determining the relative location of the device that is to assist by adding additional channels (which may be additional frequencies, frequency/timeslots, or channelization codes) is straightforward using GPS location made by node 104 or time delay measurements to and from node 104 made by controller 105. Statistical independence in the spectrum sensing environment depends on the physical makeup of the environment. In an indoor environment, spatial separation of less than 10 meters can lead to statistical independence. Outdoors, hundreds of meters may be required in an urban building environment but even more separation is needed in an open environment that lacks obstructions. For this reason, taking statistics from the measurements of the nodes themselves may be more useful unless the environment is well known. If the desire is to form a peer-to-peer network between cooperative nodes 104, statistical independence can typically be met while also providing distances that are not prohibitive of peer-to-peer communication since propagation and statistical independence are highly correlated.

Typically controller 105 will have access to a database or table describing the transmission modulation scheme employed by the primary user. If each node 104 identifies its modulation sensing capability to controller 105 or to other nodes 104, then complementary modulation sensing capabilities can be identified. Having complementary modulation sensing capability is defined as the ability to sense modulation transmission schemes that are not within the capability of the assisted devices.

This process of identifying which of nodes 104 are best suited for assisting other nodes 104 is advantageous but not a requirement, since the present invention will enhance spectrum-sensing efficiency even without having to determine which nodes 104 are best suited for assisting other nodes 104. However, any or all of the previously mentioned alternatives can be deployed to further enhance the spectrum-sensing efficiency and performance of the communication system.

FIG. 2 is a block diagram of node 104. As shown, node 104 comprises logic circuitry 203 (microprocessor 203), receive circuitry 202, and transmit circuitry 201, and channel analyzer 205. Logic circuitry 203 preferably comprises a microprocessor controller, such as, but not limited to a Freescale PowerPC microprocessor. In the preferred embodiment of the present invention logic circuitry 203 serves as means for controlling node 104. Channel analyzer 205 serves as means for analyzing particular channels for transmissions. Additionally receive and transmit circuitry are common circuitry known in the art for communication utilizing a well known communication protocol, and serve as means for transmitting and receiving messages. For example, receiver 202 and transmitter 201 are well known transmitters that utilize the IEEE 802.22 communication system protocol. Other possible transmitters and receivers include, but are not limited to transceivers utilizing Bluetooth, IEEE 802.11, or HyperLAN protocols.

FIG. 3 is a flow chart showing operation of node 200 of FIG. 2. The logic flow begins at step 301 where receiver 202 receives a list of channels to monitor from controller 105. The list of channels may comprise channels comprising a group of frequencies, a group of frequency/timeslots, or a group of channelization codes to monitor. The channels are then monitored by monitoring circuitry 205 for transmissions as part of a secondary communication system (step 303). At step 305 logic circuitry 203 determines if any channel from the group of the channels has transmissions by a primary user, and if not, the logic flow returns to step 303. If, however, logic circuitry 203 determines that particular channel(s) have activity (i.e., transmissions by the primary user), the channel(s) is removed from the group of channels being monitored (step 307) and the information is transmitted (via transmitter 201) back to controller 105 (step 309). The information transmitted back to controller 105 may comprise information that that no transmissions have been detected on channels from the group of channels, and/or that transmissions have been detected on a particular channel.

Alternately, the list of channels to monitor may initially be contained in a policy embedded in logic circuitry 203. This policy may be updated via the controller 105 or via other nodes 104 as transmissions are detected.

It should be noted that the removal of a particular channel from monitoring may be temporary (e.g., 5 minutes), with node 200 again monitoring the particular channel after a predetermined period of time. Additionally, it should be noted that transmitting the information to controller 105 causes the controller to communicate, or share, the information to the at least one other node.

At step 311 a determination is made by logic circuitry 203 whether or not other channels from outside the group of channels need monitoring, and if so, the logic flow continues to step 313. It should be noted that the determination that other channels may need monitoring will preferably be made by analyzing messages from controller 105 instructing node 200 to monitor additional channels. Thus, if instructed to monitor additional channels, the additional channels are added to the group of channels being monitored for transmissions (step 313). The added channels preferably differ from the channels originally monitored by node 200. The logic flow then returns to step 303.

As described above, the additional channels provided to node 200 at step 311 may comprise channels where no transmissions has been detected by any node, yet have not met a certain criteria for inactivity. For example, a predetermined number of nodes may have to detect the absence of primary user activity on a channel prior to the channel being declared inactive and authorized for use. Furthermore, the additional channels provided to node 200 may ensure that node 200 continues to monitor a predetermined number (N) of channels. Other criteria for declaring a channel inactive exist that do not depend solely on the number of nodes detecting but on the results of their algorithmic combination of sensing results, and they can be used without departing from the scope of the invention.

It should also be noted that while not particularly mentioned in the logic flow of FIG. 3, it is assumed that node 200 will receive information from controller 105 about channels that have been detected as "active" by other nodes within the communication system. Thus, when node 200 wishes to communicate, this information can be taken into consideration when choosing a particular channel.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method comprising the steps of:
    monitoring a group of channels for transmissions as part of a secondary communication system;
    determining that a channel from the group of the channels has transmissions by a primary user;
    removing the channel from the group of channels being monitored;
    determining that other channels from outside of the group of channels need monitoring;
    adding channels outside the group of channels to the group of channels being monitored for transmissions.

2. The method of claim 1, wherein other channels comprise those channels where no transmissions have been detected, yet have not met a certain criteria for inactivity.

3. The method of claim 1 wherein the step of removing the channel from the group of channels being monitored comprises the step of temporarily removing the channel from the group of channels being monitored.

4. The method of claim 1 further comprising the step of:
    communicating information about the channel that has transmissions to the at least one other node within the communication system.

5. The method of claim 4 wherein the step of communicating the information about the channel that has transmissions comprises the step of communicating the information to a controller, causing the controller to communicate the information to the at least one other node.

6. The method of claim 1 further comprising the step of:
    receiving information about channels having detected transmissions from other nodes within the communication system.

7. The method of claim 1 further comprising the step of:
    communicating that no transmissions have been detected on channels from the group of channels.

8. The method of claim 1 wherein the group of channels comprises a group of frequencies, a group of frequency/timeslots, or a group of channelization codes.

9. A method comprising the steps of:
    monitoring a group of N channels for activity as part of a secondary communication system;
    determining that a channel from the group of N channels has activity by a primary user;
    removing the channel from the group of N channels being monitored;
    determining that other channels from outside of the group of N channels need monitoring;

adding channels outside the group of channels to the group of channels being monitored for activity so that a total number of channels being monitored is equal to N channels.

10. The method of claim 9, wherein other channels comprise those channels where no activity has been detected, yet have not met a certain criteria for inactivity.

11. The method of claim 9 wherein the step of removing the channel from the group of N channels being monitored comprises the step of temporarily removing the channel from the group of N channels being monitored.

12. The method of claim 9 further comprising the step of:
communicating information about the channel that has activity to the at least one other node within the communication system.

13. The method of claim 12 wherein the step of communicating the information about the channel that has activity comprises the step of communicating the information to a controller, causing the controller to communicate the information to the at least one other node.

14. The method of claim 9 further comprising the step of:
receiving information about channels having detected activity from other nodes within the communication system.

15. The method of claim 9 further comprising the step of:
communicating that no activity has been detected on channels from the group of channels.

16. The method of claim 9 wherein the group of N channels comprises a group of frequencies, a group of frequency/timeslots, or a group of channelization codes.

17. An apparatus comprising:
monitoring circuitry monitoring a group of channels for transmissions as part of a secondary communication system; and
logic circuitry determining that a channel from the group of the channels has transmissions by a primary user, removing the channel from the group of channels being monitored, determining that other channels from outside of the group of channels need monitoring, and adding channels outside the group of channels to the group of channels being monitored for transmissions.

18. The apparatus of claim 17, wherein other channels comprise those channels where no transmissions have been detected, yet have not met a certain criteria for inactivity.

19. The apparatus of claim 17 wherein the logic circuitry temporarily removes the channel from the group of channels being monitored.

20. The apparatus of claim 17 further comprising:
transmission circuitry communicating information about the channel that has transmissions to the at least one other node within the communication system.

* * * * *